Figure 1:
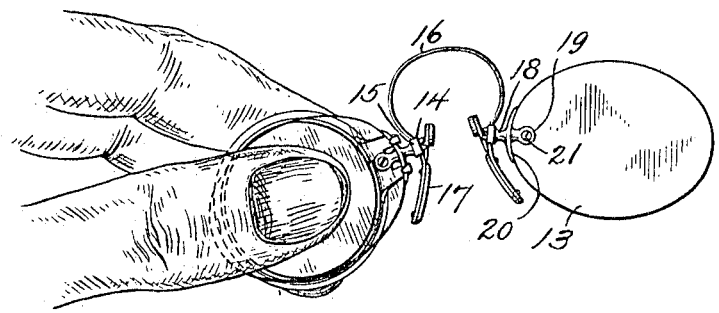

J. M. CHAPPEL.
LENS HOLDER.
APPLICATION FILED MAR. 2, 1908.

949,413.

Patented Feb. 15, 1910.

Witnesses:
A. L. Lord
Ros Weiss

Inventor.
James M. Chappel.
by Brockett & Kwis
Attorneys.

UNITED STATES PATENT OFFICE.

JAMES M. CHAPPEL, OF DALLAS, TEXAS.

LENS-HOLDER.

949,413.  Specification of Letters Patent.  Patented Feb. 15, 1910.

Application filed March 2, 1908. Serial No. 418,802.

*To all whom it may concern:*

Be it known that I, JAMES M. CHAPPEL, citizen of the United States, residing at Dallas, in the county of Dallas and State of Texas, have invented certain new and useful Improvements in Lens-Holders, of which the following is a specification.

This invention relates to holders for lenses of eyeglasses, spectacles and the like, and has for its object the provision of a tool or holder which will facilitate the assembling or disassembling of the parts of such devices and lessen the danger of breaking the lenses.

Lenses of eyeglasses are usually secured to lens holding or attaching devices and in the case of rimless spectacles having temples which pass around the ears the lenses are secured to so-called end-pieces to which the temples are hinged, by means of parallel straps extending from the edge of the lens on both sides thereof and transverse screws which pass through the straps and lenses, the lenses being held against movement about the screws by oppositely extending spring wings or projections which bear against the edges of the lenses.

In assembling the parts of eyeglasses or spectacles, it is a rather difficult matter to hold the parts in proper position to bring the openings in the straps and lenses in alinement and pass the screws through the same, thus causing the expenditure of considerable time and labor, and very frequently the lenses are broken.

In carrying out my invention I provide a lens holder comprising a box-like frame or inclosure which contains a pad of yieldable material such as rubber projecting above the top and has on the side a pair of outwardly and upwardly extending fingers or projections which receive the member to be attached to the lens and against which it can be held or pressed. The frame or inclosure is preferably in the form of a ring or band having at the bottom an inwardly extending flange which forms an abutment for the pad and the upwardly extending fingers are preferably formed by a slotted or bifurcated bracket secured to the side of the frame.

In using this holder the lens is placed flat against the pad with the upwardly extending ends of the bifurcated bracket on the outside of the device to be secured to the lens. The lens can be pressed against the pad and the ends of the bracket, between the thumb and fingers and in that manner the parts can be held in just the desired position and considerable pressure can be applied to the lens with little danger of breaking the same.

In assembling the parts by the use of the holder, the spring projections which engage the edges of the lens are first bent slightly inward so that when the lens is inserted between the straps the lens will first engage the ends of the projections. The lens is then moved inward, by the pressure of the thumb against the tension of the spring projections, bending the latter outward until the holes in the straps and lens are in alinement. Consequently when the screw is inserted in place the projections or wings are sure to engage the edge of the lens firmly and by their elasticity prevent the turning of the lens about the screw.

My invention may be further briefly summarized as consisting in certain novel details of construction and combinations and arrangements of parts which will be described in the specification and set forth in the appended claims.

For a better understanding of my invention reference is had to the accompanying drawings, in which—

Figure 2:
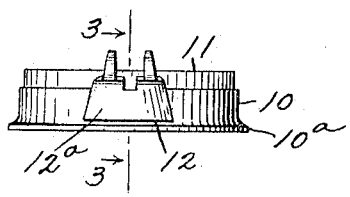
Figure 3:
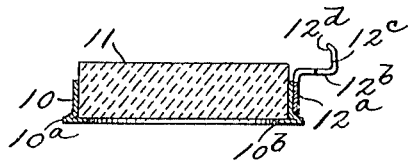
Figure 4:
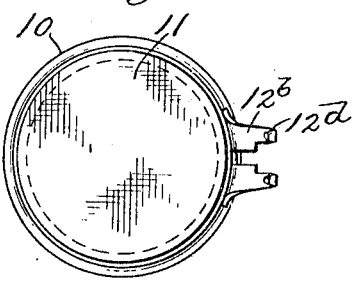

Figure 1 is a perspective view showing my improved holder and the lens of a pair of nose glasses held thereto, and showing its manner of use; Fig. 2 is a side elevation of the holder; Fig. 3 is a sectional view, the section being taken approximately along the line 3—3 of Fig. 2; and Fig. 4 is a plan view of the holder.

In carrying out my invention any preferred form and construction of parts may be employed but in the drawings I have shown one embodiment which meets the necessary requirements very effectively and in such embodiment, 10 represents a frame or inclosure which is preferably formed of metal and in this instance is in the form of a ring or band. The inclosure is open at the top and at the bottom has an outwardly extending rim or bead $10^a$ and an inwardly extending flange $10^b$, which forms an abutment for a pad 11 preferably of fairly firm but elastic rubber, which completely fills the inclosure, having a close fit within the cylindrical band, so that it will not fall out, and extends above the upper edge of the band.

On the side of the rim or band and preferably secured thereto by solder or rivets is a bracket 12 having a portion 12$^a$ which bears against the outer circular wall of the band and extends slightly above the same, and a slotted or bifurcated portion which first extends outward from the portion 12$^a$ at substantially right angles, as shown at 12$^b$ and is thence bent upwardly as shown at 12$^c$, the extreme ends 12$^d$ being bent slightly inward. The portion 12$^c$ is preferably at substantially right angles to the portion 12$^b$ forming a pair of hook-like arms which extend upward above the upper face of the rubber pad. The distance between the upwardly extending arms or the width of the slot in the portion 12$^c$ and the width of the slot in the outer part of the portion 12$^b$ is wider than that part of the slot near the band, the latter being merely wide enough to receive the free end of the attaching screw as it is inserted in place to secure the straps and lens together.

Referring now to Fig. 1 of the drawings which shows how the holder is used with noseglasses, 13 represents the lenses, 14 the lens attaching devices known as box-studs, having boxes 15 which receive the ends of the bridging member 16 and guards 17, and posts or studs 18 provided with straps 19 which engage the sides of the lenses and spring wings or projections 20 which engage the edges of the lenses. The box-studs are secured to the lenses by transverse screws 21 which pass through alined openings in the straps 19 and lenses. When it is desired to secure the box-stud to a lens or to remove it therefrom, the holder and lens are placed in the position shown in Fig. 1, with the lens flat against the rubber pad 11 with the stud or post of the box-stud between the arms of the bracket. By pressing the lens with the thumb against the pad and toward the bracket, the wings or projections 20 will engage the two spaced arms of the bracket and the parts will be held tightly in the desired position without any danger of breaking the lens. If the parts are to be assembled the two wings or projections 20 are first bent slightly inward toward each other, and the lens is then pressed inward against the ends of the projections which are then bent outward until the holes in the strap and lens are in alinement, after which the screw can be placed in position. When the parts are assembled in this manner, the lens will not become loose since the elasticity of the projections 20 holds the lens firmly in place. When the parts are not assembled with the holder, it is a difficult matter to press the lens inwardly against the ends of the inwardly bent wings or projections with the fingers alone, and unless the wings are not first bent inwardly the lens very soon becomes loose. If it is desired to remove the screw, it can be easily done without any danger of breaking the lens, which is often done if the lens is held in the fingers without the holder.

I do not desire to be confined to the exact details shown but aim in my claims to cover all modifications which do not involve a departure from the spirit and scope of my invention.

What I claim as new and desire to secure by Letters Patent is:—

1. An article of manufacture comprising a frame having a soft or yieldable pad, and a pair of hooked fingers secured to said frame and having portions projecting upwardly above the top of the pad laterally beyond the same.

2. In a lens holder, a frame having a soft or yieldable pad and having secured thereto a bifurcated or slotted bracket which extends outwardly from said frame and upwardly above the top of the pad laterally beyond the same.

3. In a lens holder, a band containing a yieldable pad which extends above the top of the same, and a pair of hooked fingers secured to said band and having upwardly projecting ends located laterally beyond the pad.

4. In a lens holder, a frame in the form of a band containing a yieldable pad which extends above the top of the same, said frame having secured to its side a bifurcated bracket having fingers which extend outwardly and upwardly above the top of the pad.

5. In a lens holder, a frame in the form of a band having at the bottom an inwardly extending flange, a rubber pad having a tight fit in said frame and resting against said flange, and a bifurcated or slotted bracket secured to the side of the frame and having fingers which extend outwardly and upwardly above the top of the pad.

6. In a lens holder, a frame having a yieldable pad, and a slotted bracket extending from the side of the frame and having fingers which project outwardly and thence upwardly, the outer portion of the slot being wider than the inner portion thereof.

7. In a lens holder, a frame having a yieldable pad and having secured to the side thereof a bifurcated or slotted bracket having fingers which extend outwardly in substantially the same direction, thence upwardly, and have their extreme ends extending inwardly toward the frame.

8. A lens holder comprising a frame or inclosure having a pad upon which the lens is adapted to be placed and having an abutment against which the lens straps are adapted to engage, said abutment being located laterally beyond the pad and frame and being supported from the side of the latter, and said abutment having a slot through which the post or stud carrying the straps is adapted to extend.

In testimony whereof I affix my signature in presence of two witnesses.

JAMES M. CHAPPEL.

Witnesses:
A. F. KWIS,
R. M. CALFU.